US007818670B2

(12) United States Patent
Yamada

(10) Patent No.: US 7,818,670 B2
(45) Date of Patent: Oct. 19, 2010

(54) INFORMATION PROCESSING APPARATUS HAVING DETECTION UNIT AND PREVIEW UNIT AND PROGRAM FOR SAME

(75) Inventor: Kazutaka Yamada, Aichi-ken (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1106 days.

(21) Appl. No.: 11/390,478

(22) Filed: Mar. 28, 2006

(65) Prior Publication Data

US 2006/0236235 A1    Oct. 19, 2006

(30) Foreign Application Priority Data

Mar. 30, 2005    (JP)    ............... 2005-099260

(51) Int. Cl.
  *G06F 3/14*  (2006.01)
  *G06F 3/12*  (2006.01)
(52) U.S. Cl. .................................................. 715/274
(58) Field of Classification Search .................. 715/274
   See application file for complete search history.

(56) References Cited

U.S. PATENT DOCUMENTS

| 5,963,216 | A  | * | 10/1999 | Chiarabini et al. | .......... 345/660 |
| 6,615,234 | B1 | * | 9/2003  | Adamske et al.    | ............ 709/203 |
| 6,816,270 | B1 | * | 11/2004 | Cooper et al.     | ............. 358/1.13 |
| 7,369,263 | B2 |   | 5/2008  | Azami             |                   |
| 2005/0179926 | A1 | * | 8/2005 | Nishikawa et al. | ......... 358/1.13 |
| 2005/0286100 | A1 | * | 12/2005 | Uotani et al.    | ............... 358/527 |
| 2006/0215197 | A1 | * | 9/2006 | Tobioka          | ..................... 358/1.13 |

FOREIGN PATENT DOCUMENTS

| EP | 933692 A2 | * | 8/1999 |
| JP | H11 203099 |   | 7/1999 |
| JP | H11-237967 A |   | 8/1999 |
| JP | 2001-209517 A |   | 8/2001 |
| JP | 2004-157940 A |   | 6/2004 |

OTHER PUBLICATIONS

Terry, Michael et al. "Side Views: Persistent, On-Demand Previews for Open-Ended Tasks". 2002 Association for Computing Machinery.*
Japan Patent Office, Office Action in corresponding Japanese Patent Application No. 2005-099260 dated Jul. 29, 2008.

* cited by examiner

*Primary Examiner*—Stephen S Hong
*Assistant Examiner*—Tyler J Schallhorn
(74) *Attorney, Agent, or Firm*—Baker Botts L.L.P.

(57) ABSTRACT

An information processing apparatus includes: a multi-task operating system which displays a plurality of windows for displaying information on a display device; a detection unit which detects an active window among the windows; a determination unit which determines whether or not a task for managing the active window corresponds to a predetermined kind of tasks; a image data creating unit which creates print preview image data when the task corresponds to the predetermined kind of tasks; and a preview unit which displays an image on a dedicated window based on the print preview image data, wherein: the task performs display processing of user data on the active window; and the print preview image data corresponds to a print output result of the user data.

4 Claims, 6 Drawing Sheets

US 7,818,670 B2

INFORMATION PROCESSING APPARATUS HAVING DETECTION UNIT AND PREVIEW UNIT AND PROGRAM FOR SAME

CROSS-REFERENCE TO THE RELATED APPLICATION(S)

This application is based upon and claims a priority from prior Japanese Patent Applications No. 2005-099260 filed on Mar. 30, 2005, the entire contents of which are incorporated herein by reference.

TECHNICAL FIELD

The present invention relates to an information processing apparatus having a print preview function and a program.

BACKGROUND

Conventionally, an information processing apparatus having a print preview function has been widely known. The print preview function refers a function of displaying an image for showing a print output result on a display device so that a user can check the image of data, which will be printed out by a print device, before printing out.

In the information processing apparatus having the print preview function, for example, when a user instructs the information processing apparatus to perform the print preview function by manipulating an input device, such as a keyboard or a pointing device, a program which performs the print preview function installed in application software is executed, and an image showing a print output result with respect to data dealt with by the application software is displayed on a display device.

In addition, there is known an information processing apparatus having the print preview function, in which a plurality of pages of preview images are simultaneously created to be displayed on a display device (for example, see JP-A-11-203099).

SUMMARY

Generally, a multi-task operating system capable of displaying a plurality of windows on a display device (for example, Windows (registered trademark)) is installed in an information processing apparatus, such as a personal computer.

When the information processing apparatus operated by this kind of multi-task operating system is used, a user can operate application software corresponding to each window and write and read a plurality of data at the same time through the windows.

However, in the above, when the user tries to previously check a print output result of data being written or read on each window, the user should operate an input device so as to switch an active window, perform a plurality of operations corresponding to each of the active windows, and input an instruction for executing a print preview function.

The present invention is made in consideration of the above problem, and it is an object of the invention that provides an information processing apparatus and a program capable of checking a print output result of user data to be displayed on a corresponding window without performing input operations (the plurality of operations) for a print preview function for every window by a user.

In order to achieve the above object, according to an aspect of the invention, there is provided an information processing apparatus including: a multi-task operating system which displays a plurality of windows for displaying information on a display device; a detection unit which detects an active window among the windows; a determination unit which determines whether or not a task for managing the active window corresponds to a predetermined kind of tasks; a image data creating unit which creates print preview image data when the task corresponds to the predetermined kind of tasks; and a preview unit which displays an image on a dedicated window based on the print preview image data, wherein: the task performs display processing of user data on the active window; and the print preview image data corresponds to a print output result of the user data.

In addition, it is possible to perform a function of each unit in the information processing apparatus in a computer by using a program.

According to another aspect of the invention, there is provided a computer program product for enabling a computer to have a print preview function, including: software instructions for enabling the computer to perform predetermined operations; and a computer readable medium bearing the software instructions, wherein: the computer is operated by a multi-task operating system that displays a plurality of windows for displaying information; the predetermined operations includes: detecting an active window among the windows; determining whether or not a task for managing the active window corresponds to a predetermined kind of tasks; creating print preview image data when the task corresponds to the predetermined kind of tasks; and displaying an image on a dedicated window based on the print preview image data; the task performs display processing of user data on the active window; and the print preview image data corresponds to a print output result of the user data.

BRIEF DESCRIPTION OF THE DRAWINGS

These and other objects and advantages of the present invention will be more fully apparent from the following detailed description taken in conjunction with the accompanying drawings, in which.

DETAILED DESCRIPTION OF THE ILLUSTRATIVE ASPECTS

Hereinafter, an illustrative aspect according to the invention will be described in reference to the drawings.

Figure 1:
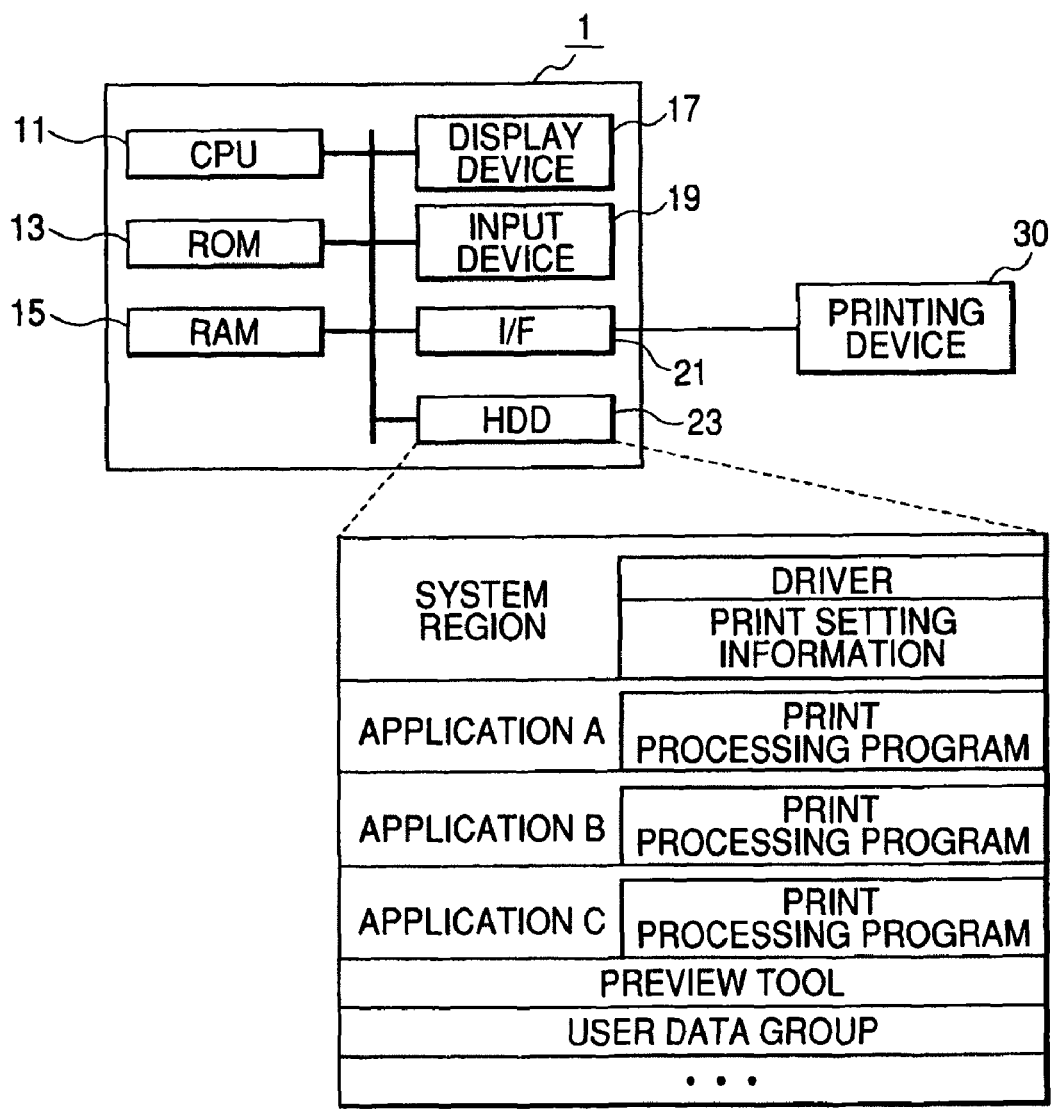
FIG. 1 is an explanatory view illustrating a configuration of an information processing apparatus 1 to which the invention is applied.

FIG. 1 is an explanatory view illustrating the construction of an information processing apparatus 1 to which the invention is applied.

The information processing apparatus 1 according to the illustrative aspect is constructed in the same manner as a well-known personal computer, and includes a CPU 11 which performs various operations according to a program, a ROM 13 which stores a boot program or the like, a RAM 15 used as an operation region when a program is executed by the CPU 11, a display device 17 which is composed of, for example, a liquid crystal monitor so as to display various information, an input device 19, such as a keyboard or a pointing device, which can be operated by a user, an interface 21 connected to a print device (printer) 30, and a hard disk device 23 which stores a program, data, or the like.

The information processing apparatus 1 is operated by a multi-task OS (operating system). On a system region of the hard disk device 23, a data group or a program group that allows the CPU 11 to perform a function as the multi-task OS is stored. On the system region, a driver program for controlling the print device 30, print setting information which is setting information concerning a printing method, or the like are also stored.

In addition, the hard disk device 23 stores a plurality kinds of application software performed by a multi-task OS. Specifically, the CPU 11 stores a program (preview tool), as one application software, for realizing a function serving as respective units of the invention. Further, the hard disk device 23 stores user data (for example, document file) created by a desired task in accordance with user input data on the basis of each application A, B, and C.

Figure 2:
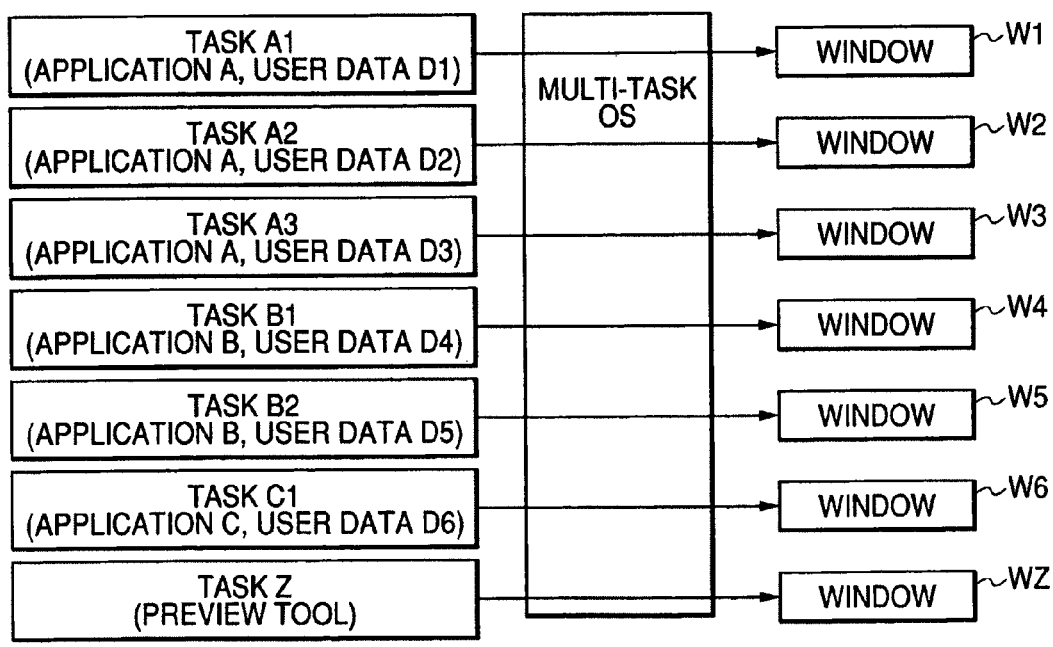
FIG. 2 is an explanatory view illustrating an operation status of multi-task OS according to an illustrative aspect.
Figure 3:
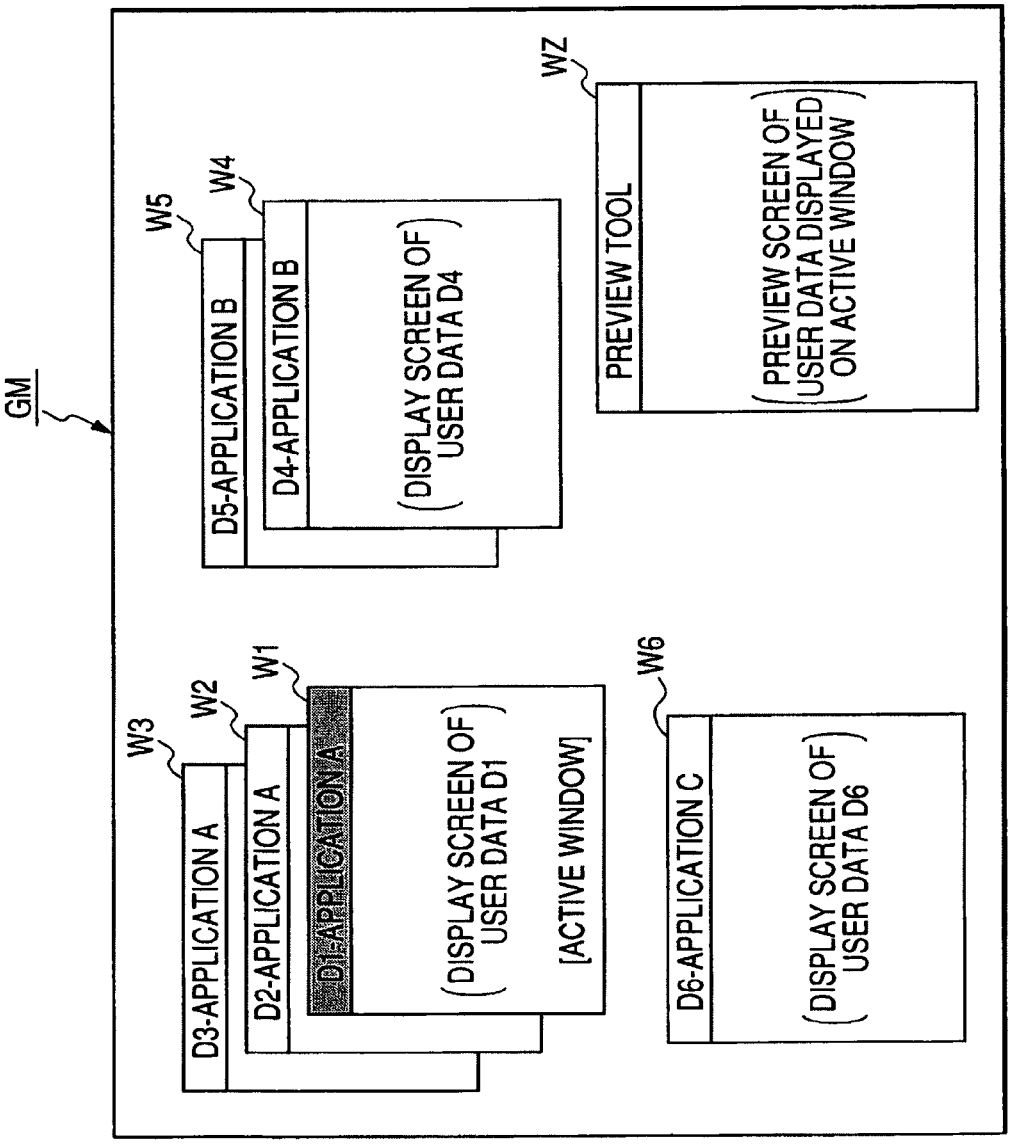
FIG. 3 is an explanatory view illustrating a configuration of a screen GM of a display device 17.

FIG. 2 is an explanatory view illustrating an operation status of multi-task OS according to the illustrative aspect. FIG. 3 is an explanatory view illustrating a configuration of a screen GM of the display device 17.

When a power is turned on, the information processing apparatus 1 according to the illustrative aspect executes a program stored in the ROM 13 by the CPU 11 and drives the multi-task OS by performing a program stored in a system area. As shown in FIGS. 2 and 3, the multi-task OS according to the illustrative aspect is configured to be capable of displaying a plurality of windows for displaying information on the display device 17. The multi-task OS executes application software instructed in accordance with a user instruction input from the input device 19, creates a window in accordance with an instruction of a task on the basis of the application software, and displays information in a desired window in accordance with the instruction of the task while displaying the desired window on the display device 17.

For example, in the information processing apparatus 1, when a user instructs to execute application software A, such as word processing software or drawing software, by specifying user data D1, the multi-task OS sets an argument of the user data D1 according to the instruction. And then, the multi-task OS executes the instructed application software A, and creates task A1 on the basis of the application software A which deals with the user data D1. In addition, if the task A1 instructs a window W1 to be created, the multi-task OS creates a new window W1 on the display device 17.

In addition, when the user instructs to executes the application software A by specifying user data D2, the multi-task OS sets the user data D2 to an argument according to the instruction. And then, the multi-task OS executes instructed application software A, and creates task A2 on the basis of the application software A which deals with the user data D2. In addition, if the task A2 instructs a window W2 to be created, the multi-task OS creates a new window W2 on the display device 17.

Further, tasks A1 to A3, B1, B2 and C1 performs display processing of specified user data D1 to D6, and display information on the basis of the user data D1 to D6 on created windows W1 to W6 through the multi-task OS. Besides, the tasks A1 to A3, B1, B2 and C1 are tasks corresponding to the application software A to C, such as the word processing processor or the drawing software created by the user data display instruction (for example, instruction to open a file).

Figure 4:
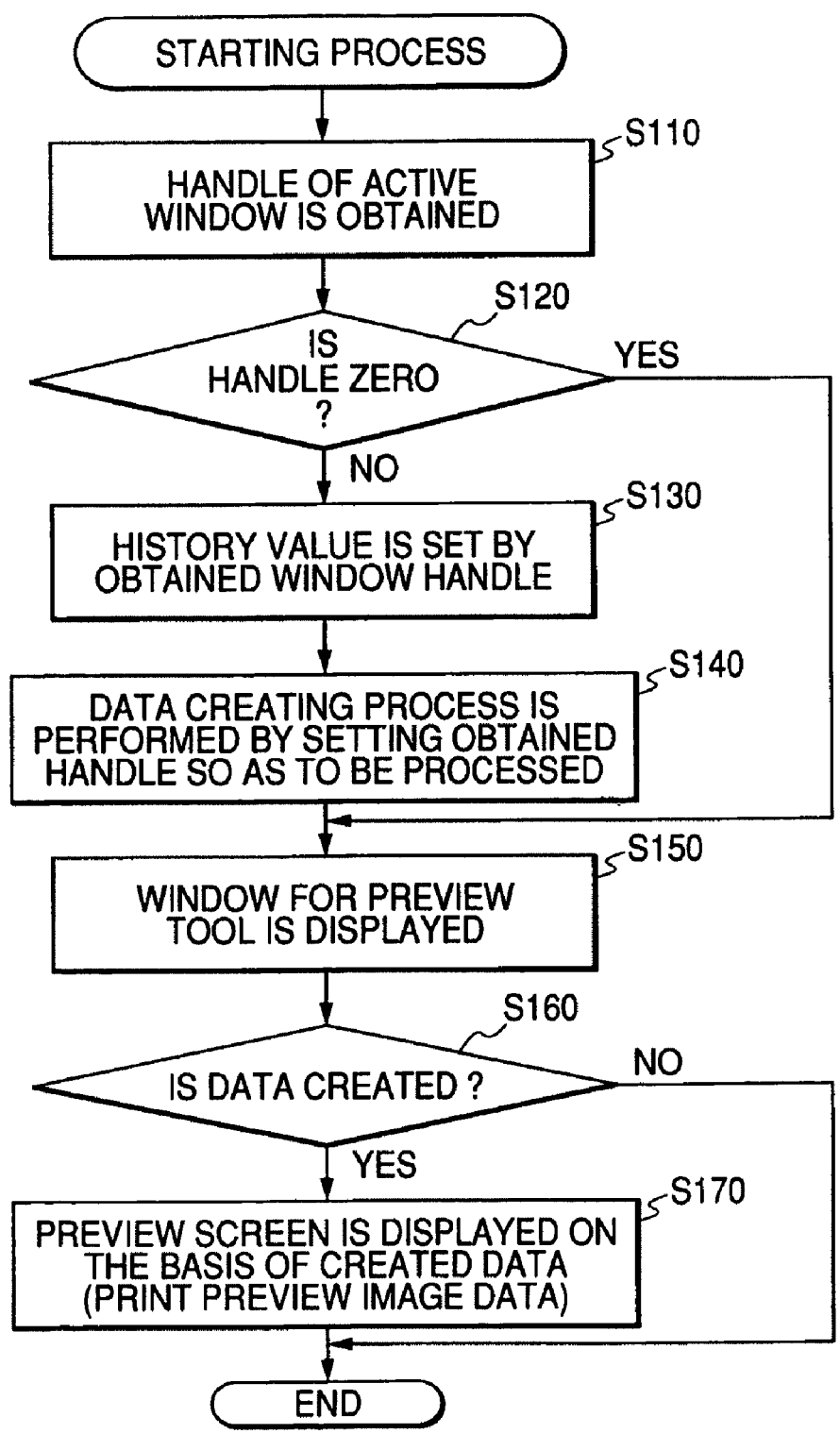
FIG. 4 is a flowchart illustrating a starting process performed by a CPU 11.

In the information processing apparatus 1, if the user inputs an instruction to execute a preview tool through the input device 19, the multi-task OS executes the preview tool stored in the hard disk device 23. Accordingly, a task Z (that is, CPU 11) which is on the basis of the preview tool performs a starting process shown in FIG. 4. FIG. 4 is a flowchart illustrating the starting process.

If the starting process is performed, the task Z inquires a handle of a current active window to the multi-task OS and obtains the handle of the current active window (window handle) (silo). The window handle is assigned to each window as identification information for each window. If there is an active window, the multi-task OS returns a handle of the active window in correspondence to the inquiry. If there is no active window, the multi-task OS returns the handle to zero.

If step S110 is terminated, the task Z determines if the handle obtained through the inquiry is zero (S120). If the handle is zero (Yes in step S120), since an active window does not exist, the process proceeds to step S150. On the other hand, it is determined that the handle obtained through the inquiry is not zero (No in step S120), the multi-task OS sets the window handle obtained as a result of the inquiry to history value H0 (history value H0=obtained active window handle) and stores the history value H0 in the RAM 15 (S130). Even though it will be explained in detail later, in the illustrative aspect, the history value H0 serves as a parameter for detecting a switch of an active window.

Figure 5:
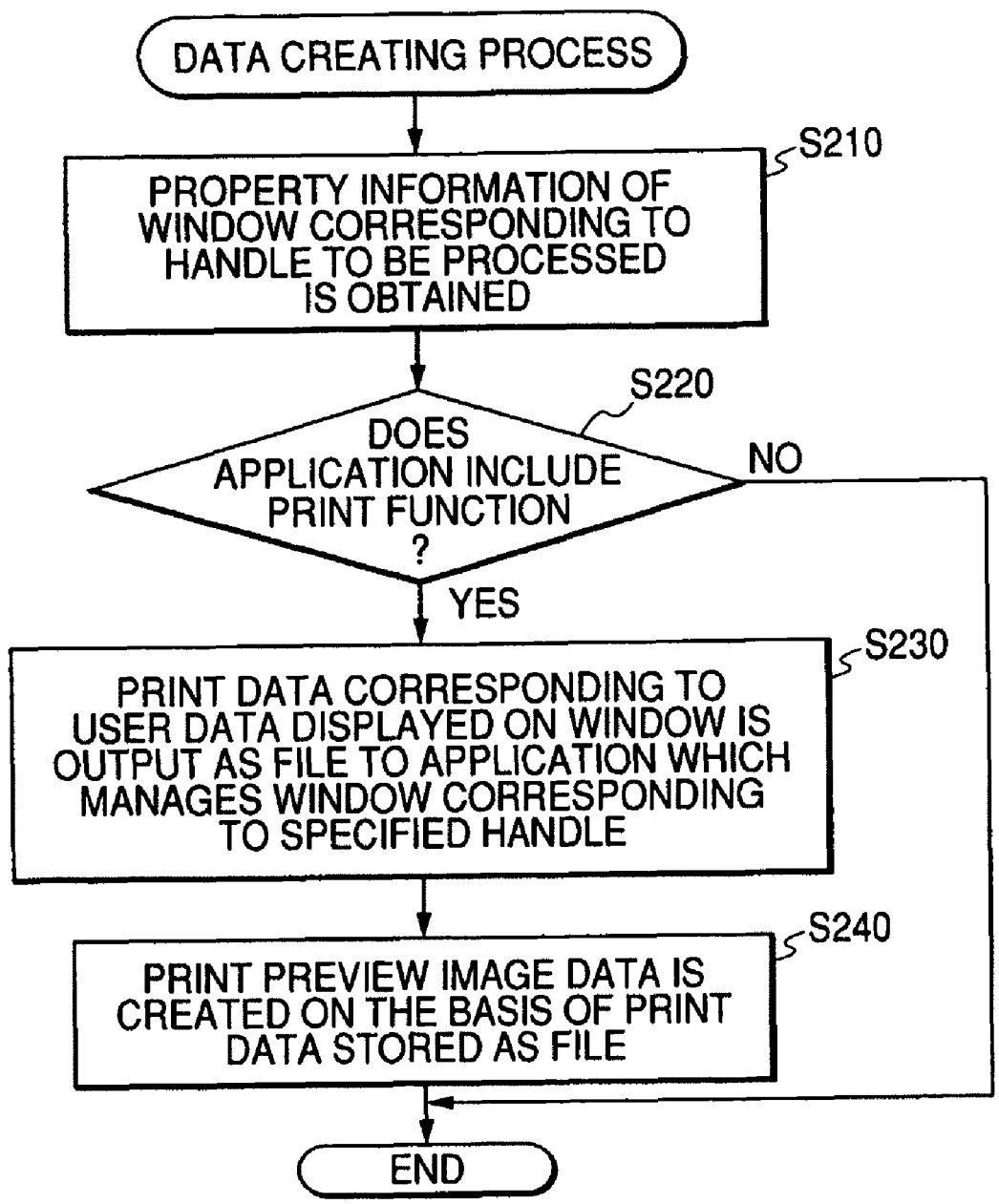
FIG. 5 is a flowchart illustrating a data creating process performed by the CPU 11.

In addition, if the process in step S130 is terminated, the task Z sets the window handle obtained in step S110 to be processed and performs a data creating process (S140). FIG. 5 is a flowchart illustrating the data creating process.

If the data creating process is started, the task Z specifies a desired handle to be processed, inquires property of a window to the multi-task OS, and obtains property information of a window corresponding to the handle (to be processed) from the multi task OS (S210).

In the illustrative aspect, pass information of an execution module (an execution file of application software) or information (file information) of user data are obtained as the property information. Besides, an execution module corresponds to the window of the handle to be processed, and the user data is performed display processing on the window by the task corresponding to the execution module.

If the process in step S210 is terminated, the task Z identifies application software corresponding to the window of the handle to be processed on the basis of the obtained property information, and determines whether or not the application software includes a print function (that is, a print process program) (S220). For example, It can be determined if the application software includes the print function by checking if the multi-task OS includes print setting information of the application software.

Further, if it is determined that the application software corresponding to the window of the handle to be processed includes the print function (Yes in step S220), the process proceeds to step S230. If it is determined that the application software corresponding to the window of the handle to be processed does not include the print function (No in step S220), the corresponding data creating process is terminated.

If the process proceeds to step S230, print data for the user data displayed by a task (on the basis of the application software), which manages the window of the handle to be processed, is created by using a print processing program included in the application software corresponding to the window of handle to be processed on the basis of the property information obtained in step S210 (S230).

Specifically, user data to be printed and an output destination (file of output destination) are specified, a print processing program of the application software (the program is capable of creating print data corresponding to the user data created by the application software) is called, and print data corresponding to the specified user data is created. Besides, the print data is generally input to the print device 30. However, in the illustrative aspect, the print data is created in the form of a file by specifying the output destination as a file (specifically, so-called PRN file or PS file).

The task Z reads the print data created by the print processing program from the hard disk device 23 and converts the print data to print preview image data (S240).

Specifically, when converting the print data to the print preview image data, a color space is converted to a RGB color space or a resolution is converted to a resolution suitable for the print preview.

Thus, if the print preview image data is created, the task Z stores the image data in the RAM 15 and terminates the corresponding data creating process.

In addition, if the data creating process is terminated in step S140, the task Z instructs the multi-task OS to create a dedicated window WZ and displays the window WZ for a corresponding preview tool on the display device 17 (S150). If the process in step S150 is terminated, it is determined whether or not the print preview image data is created by the data creating process in step S140 (S160). If it is determined that the print preview image data is not created (No in step S160), the corresponding starting process is terminated.

On the other hand, if it is determined that the print preview image data is created by the data creating process in step S140 (Yes in step S160), a preview screen based on the print preview image data is displayed in a frame of the window WZ (S170) As a result, the preview screen (image based on the print preview image data), which displays the print output result of the user data displayed on an active window, is displayed on the window WZ. If the process in step S170 is terminated, the task Z terminates the corresponding starting process.

Figure 6:
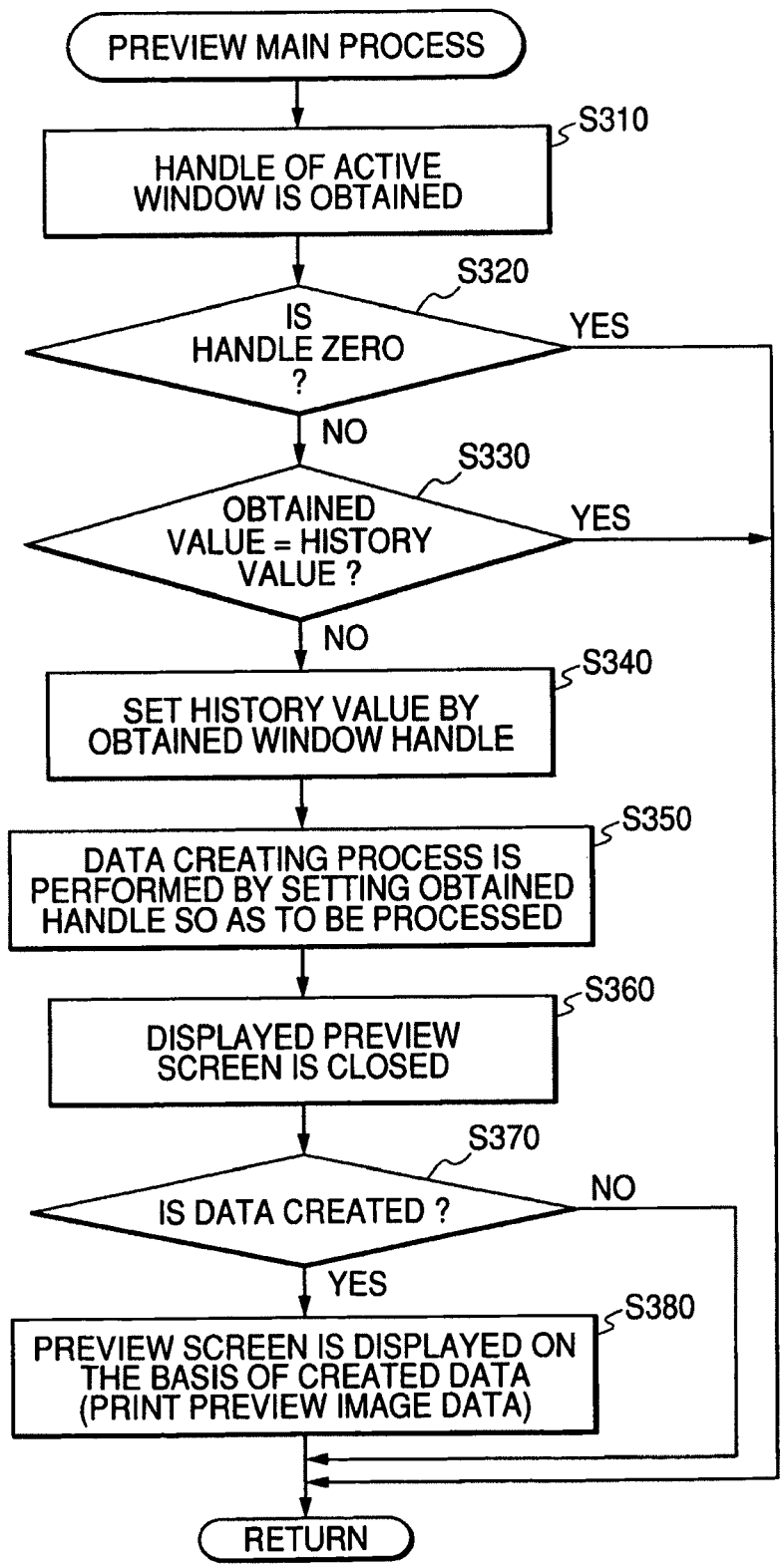
FIG. 6 is a flowchart illustrating a preview main process performed by the CPU 11.

In addition, if the task Z terminates the starting process, a preview main process as shown in FIG. 6 is repeatedly performed. FIG. 6 is a flowchart illustrating the preview main process.

If the preview main process is started, the task Z inquires a handle of a current active window to the multi-task OS and obtains the handle (window handle) of the current active window (S310).

It is determined if the handle obtained by using the inquiry is zero (S320). If it is determined that the handle is zero (Yes in step S320), the corresponding preview main process is terminated since it is considered that the active window does not exist and then the processes after step S310 are performed.

If it is determined that the handle obtained by using the inquiry in step S310 is not zero (No in step S320), the task Z compares the handle of the active window obtained as a result of the inquiry with the history value H0 stored in the RAM 15. Sequentially, it is determined whether or not the history value H0 is the same as the handle of current active window obtained in the process of step S310 (S330). If the history value H0 is an initial value (that is, in the case that the history value H0 has not been ever set in step S130 or S340), it is unexceptionally determined that the handle of the current active window is not the same as the history value H0 in step S330 (No in step S330).

In step S330, if it is determined that the history value H0 is the same as the handle of current active window (Yes in step S330), the task Z terminates the corresponding preview main process and then performs processes after step S310.

On the other hand, if it is determined that the history value H0 is not the same as the handle of current active window in step S330 (that is, it is determined that the active window is different from the active window previously detected), the task Z proceeds to step S340, sets a window handle presently obtained in step S310 to the history value H0, and stores the window handle as the history value H0 in the RAM 15.

If the process in step S340 is terminated, the task Z proceeds to step S350, sets the window handle, which is presently obtained in step S310 to be processed, and performs the data creating process as shown in FIG. 5.

According to the data creating process, if the application software corresponding to the window of the handle to be processed is the application software including a print function (print processing program) (Yes in step S220), print data of user data displayed on a window (current active window) of the handle to be processed is created by using the print processing program of the application software (S230).

The print preview image data for showing the print output result of the user data is created on the basis of the print data (S240).

On the other hand, if the application software does not include a print processing program (No in step S220), the data creating process is terminated without creating print preview image data.

If the data creating process is terminated in step S350, the task Z deletes the preview screen being displayed in the current window WZ from the window WZ (S360), and determines whether or not print preview image data is created by the data creating process in step S350 (S370).

If it is determined that the print preview image data is not created (No in step S370), the task Z terminates the corresponding preview main process and then performs the processes after step S310.

On the other hand, if it is determined that the print preview image data is created (Yes in step S370), the preview screen is displayed on the window WZ (S380). Besides, the preview screen corresponds to the print preview image data created in the data creating process in step S350.

As a result, the preview screen (image based on the print preview image data) which displays the print output result of the user data displayed on the current active window is displayed on the window WZ.

In addition, if the preview screen in the window WZ is updated to a preview screen of the user data displayed on the current active window, the corresponding preview main process is terminated and then the processes after step S310 are performed again.

Accordingly, a preview screen of the user data displayed on the current active window is displayed on the window WZ whenever the active window is switched (No in step S330) (S380).

Hereinbefore, the information processing apparatus 1 according to the illustrative aspect has been described. In step S310, the information processing apparatus 1 regularly detects an active window among the window group W1 to W6 displayed on the display device 17 by repeatedly performing the preview main process. If the detected active window is different from the active window previously detected (No in step S330), it is determined whether of not a task managing the active window presently detected is a task based on application software including a print function (print processing program) (S350 and S220).

If it is determined that the task managing the active window is the task based on the application software including the print function (Yes in step S220), the task creates print preview image data which displays the print output result of the user data performing the display process corresponding to the active window (S240).

The task displays an image based on the print preview image data in a dedicated window WZ (S380).

Accordingly, by using the information processing apparatus 1, when opening different user data D1 to D6 by using the plurality of window W1 to W6, the user can check the print output result of the user data opened (displayed) on the window by selecting a window and activating the selected window.

According to the illustrative aspect, the user can check a print output result of user data displayed on each window without selecting a window on which the user data is displayed so as to check the print output result, operating to open a menu with respect to the corresponding window, and inputting an instruction so as to perform a print preview function by using the menu as in the related art.

According to the illustrative aspect, the operability for checking the print output result can be improved than the related art.

According to the illustrative aspect, when creating print preview image data of user data on an active window, the user data is converted to print data (for example, PRN file or PS file) to be output to the print device 30 (S230). And then, the print data is converted to print preview image data (S240) by using a print processing program of application software corresponding to the window which opens the user data.

According to the illustrative aspect, even though the application software does not include a function for creating print preview image data, it is possible to display a preview screen of user data created by the application software on a dedicated window WZ.

In addition, even though a program, which converts user data to print preview image data, is not prepared for each format of the user data in a preview tool, it is possible to display the preview screen of the user data having various data formats.

The detection unit according to the invention is used in the processes of steps S110 and S310 in the illustrative aspect. The determination unit is used in the process of step S220. In addition, the image data creating unit is used in the processes of steps S230 and S240. A preview unit is used in the processes of steps S170 and S380.

Further, the information processing apparatus and the program according to the invention are not limited to the illustrative aspect and can be used in various shapes.

For example, in the illustrative aspect, when the application software corresponding to the active window includes a print processing program, the preview screen of the user data displayed on the active window is unexceptionally displayed on the window WZ. However, only a preview screen of user data displayed on a window of predetermined application software specified by the user may be selectively displayed on the window WZ.

More specifically, as shown in FIGS. 2 and 3, it can be assumed that the windows W1 to W6 and WZ are displayed on the screen GM of the display device 17 and only the application software A and the application software C are registered as predetermined application software in accordance with an operation set by the user.

Then, only the preview screens corresponding to the user data D1 displayed on the window W1 created by the task A1 based on the application software A, the user data D2 displayed on the window W2 created by the task A2 based on the application software A, the user data D3 displayed on the window W3 created by the task A3 based on the application software A, and the user data D6 displayed on the window W6 created by the task C1 based on the application software C can be displayed whenever the corresponding windows are activated. The preview screens corresponding to user data D4 and D5 displayed on the windows W4 and W5 corresponding to the application software B may be not displayed on the window WZ though the corresponding windows W4 and W5 are activated.

As described above, if only preview screens of user data displayed on windows corresponding to predetermined application software are selectively displayed on the window WZ, processing load of the information processing apparatus 1 can be decreased. Accordingly, the information processing apparatus 1 can be comfortable to be used.

What is claimed is:

1. An information processing apparatus comprising:
   an operating system which displays a plurality of windows for displaying information on a display device;
   a detection unit which repeatedly detects an active window among the windows;
   a determination unit which, when an active window newly detected by the detection unit is different from an active window previously detected by the detection unit, determines whether or not an application software corresponding to the newly detected active window has a print function;
   an image data creating unit which creates print preview image data, using the determined print function, representing a print output result of user data displayed on the newly detected active window when it is determined that the application software corresponding to the newly detected active window has a print function; and
   a preview unit which displays an image on a dedicated window based on the print preview image data, wherein the dedicated window is independent of the application software.

2. The information processing apparatus according to claim 1, wherein:
   the image data creating unit includes a program;
   the program creates print data with respect to the user data; and
   the image data creating unit converts the created print data to the print preview image data.

3. The information processing apparatus of claim 1, wherein when the newly detected active window is the same as the previously detected active window, the determination unit does not make the determination.

4. A computer program product for enabling a computer to have a print preview function, comprising:
   software instructions for enabling the computer to perform predetermined operations; and
   a computer readable medium bearing the software instructions, wherein:
   the computer is operated by an operating system that displays a plurality of windows for displaying information;
   the predetermined operations includes:
      repeatedly detecting an active window among the windows;
      determining, when a newly detected active window by the detection unit is different from an active window previously detected, whether or not an application software corresponding to the newly detected active window has a print function;
      creating print preview image data, using the determined print function, representing a print output result of user data displayed on the newly detected active window when it is determined that the application software corresponding to the newly detected active window has a print function; and
      displaying an image on a dedicated window based on the print preview image data, wherein the dedicated window is independent of the application software.

* * * * *